United States Patent [19]

Zwettler

[11] Patent Number: 5,893,526

[45] Date of Patent: Apr. 13, 1999

[54] TAPE GUIDES FOR DATA CARTRIDGES

[75] Inventor: Christopher J. Zwettler, Maplewood, Minn.

[73] Assignee: Imation Corp., Oakdale, Minn.

[21] Appl. No.: 08/832,130

[22] Filed: Apr. 3, 1997

Related U.S. Application Data

[63] Continuation of application No. 08/699,704, Aug. 8, 1996, abandoned, which is a continuation of application No. 08/246,169, May 19, 1994, abandoned.

[51] Int. Cl.$^6$ .......................... G11B 23/04; G11B 23/087
[52] U.S. Cl. .......................... 242/346; 242/342; 360/132
[58] Field of Search .................... 242/346, 342, 242/352.4, 344; 360/132, 130.21

[56] References Cited

U.S. PATENT DOCUMENTS

| | | | |
|---|---|---|---|
| 3,432,111 | 3/1969 | Ryder | 242/346 |
| 3,831,882 | 8/1974 | Fitterer et al. | 242/346 |
| 3,861,619 | 1/1975 | Wolff | 242/188 |
| 4,221,348 | 9/1980 | Moeller | 242/192 |
| 4,466,564 | 8/1984 | Smith et al. | 226/170 |
| 4,523,727 | 6/1985 | Morioka | 242/192 |
| 4,534,523 | 8/1985 | Zarr | 242/192 |
| 4,561,609 | 12/1985 | Collins et al. | 242/192 |
| 4,571,655 | 2/1986 | Merle | 360/132 |
| 4,571,789 | 2/1986 | Morioka | 24/625 |
| 4,581,189 | 4/1986 | Smith et al. | 264/131 |
| 4,594,772 | 6/1986 | Bucher | 29/603 |
| 4,607,808 | 8/1986 | Collins | 242/192 |
| 4,694,369 | 9/1987 | Ramsay | 242/346 X |
| 4,785,367 | 11/1988 | Ohya | 360/130.21 |
| 4,863,114 | 9/1989 | Moeller et al. | 242/188 |
| 4,993,661 | 2/1991 | Tollefson | 242/132 X |
| 5,097,374 | 3/1992 | Koizumi et al. | 360/132 |
| 5,104,058 | 4/1992 | Eggebeen | 242/199 |
| 5,173,828 | 12/1992 | Tanzer et al. | 360/130.21 |
| 5,204,796 | 4/1993 | Koizumi et al. | 360/132 |
| 5,251,844 | 10/1993 | Albrecht et al. | 242/179 |
| 5,289,988 | 3/1994 | Madsen | 242/192 |
| 5,294,072 | 3/1994 | East et al. | 242/199 |
| 5,326,044 | 7/1994 | Haller | 242/342 X |
| 5,377,927 | 1/1995 | Erickson et al. | 242/346 |
| 5,490,029 | 2/1996 | Madsen et al. | 360/132 |

FOREIGN PATENT DOCUMENTS

| | | |
|---|---|---|
| 0 076 205 | 4/1983 | European Pat. Off. . |
| 0 274 197 | 7/1988 | European Pat. Off. . |
| 0 317 297 | 5/1989 | European Pat. Off. . |
| 0 536 912 | 4/1993 | European Pat. Off. . |
| 2033503 | 1/1971 | Germany . |
| 2 033 503 | 1/1971 | Germany . |

OTHER PUBLICATIONS

IBM Technical Disclosure Bulletin, "Compliant Tape Guide," vol. 14, No. 2, Jul. 1971, p. 399.
IBM Technical Disclosure Bulletin, "Continuous Compliant Tape Guide," vol. 15, No. 8, Jan. 1973, p. 2502.
IBM Technical Disclosure Bulletin, "Air Supported Compliant Tape Guide," vol. 17, No. 4, Sep. 1974, p. 966.
IBM Technical Disclosure Bulletin, "Tape Guiding Analysis," vol. 24, No. 11B, Apr. 1982, p. 5776.
IBM Technical Disclosure Bulletin, "Tape Tension Control," vol. 25, No. 1, Jun. 1982, p. 444.
IBM Technical Disclosure Bulletin, "Air Bearing Tape Guide," vol. 25, No. 1, Jun. 1982, p. 447.

(List continued on next page.)

*Primary Examiner*— John Q. Nguyen
*Attorney, Agent, or Firm*—Eric D. Levinson

[57] ABSTRACT

An elongated tape guide for magnetic tape transported in a data cartridge provides an elongated support wall to guide the tape. The elongated tape guide has a tape guide wall and at least one flange for supporting an edge of the tape as it moves across a transducer. The tape guide can be formed to a desired cross section and then bent to provide the desired path. Suitable hard surface materials and dry lubricants can be used on the surface and impregnated with a dry lubricant. The guide wall is provided with a light transmitting aperture for transmitting light when apertures in the tape indicating a tape end align with the aperture in the guide wall.

8 Claims, 3 Drawing Sheets

OTHER PUBLICATIONS

IBM Technical Disclosure Bulletin, "Compliant Tape Guide," vol. 25, No. 2, Jul. 1982, p. 809.

IBM Technical Disclosure Bulletin, "Web–Guiding Stress Functions," vol. 25, No. 4, Sep. 1982, p. 2069.

IBM Technical Disclosure Bulletin, "Antimodal Compliant Tape Guide," vol. 26, No. 7A, Dec. 1983, p. 3398.

IBM Technical Disclosure Bulletin, "Variable Spring–Rate Compliant Guide," vol. 26, No. 8, Jan. 1984, p. 4267.

IBM Technical Disclosure Bulletin, "Tape Guide Design," vol. 27, No. 7B, Dec. 1984, p. 4360.

IBM Technical Disclosure Bulletin, "Compliant Guide Assembly With High Wear Resistance Contact Pads," vol. 29, No. 5, Oct. 1986, p. 2126.

IBM Technical Disclosure Bulletin, "Tape Guide Assemblies With Weighted Buttons," vol. 31, No. 3, Aug. 1988, p. 232.

IBM Technical Disclosure Bulletin, "Compliant Cleaner Blade Tape Guide," vol. 32, No. 3B, Aug. 1989, p. 175.

Topham, "Mechanical Design of a New Quarter–Inch Cartridge Tape Drive," Hewlett–Packard Journal, Aug. 1989, p. 67.

Covino, "Hard Coat Plus Solid Lube Fights Wear Problems," *Metal Progress*, Jun. 1975, pp. 69–70.

Seitzinger, "Coatings that Cut Friction," *Machine Design*, Oct. 1976, pp. 114–119.

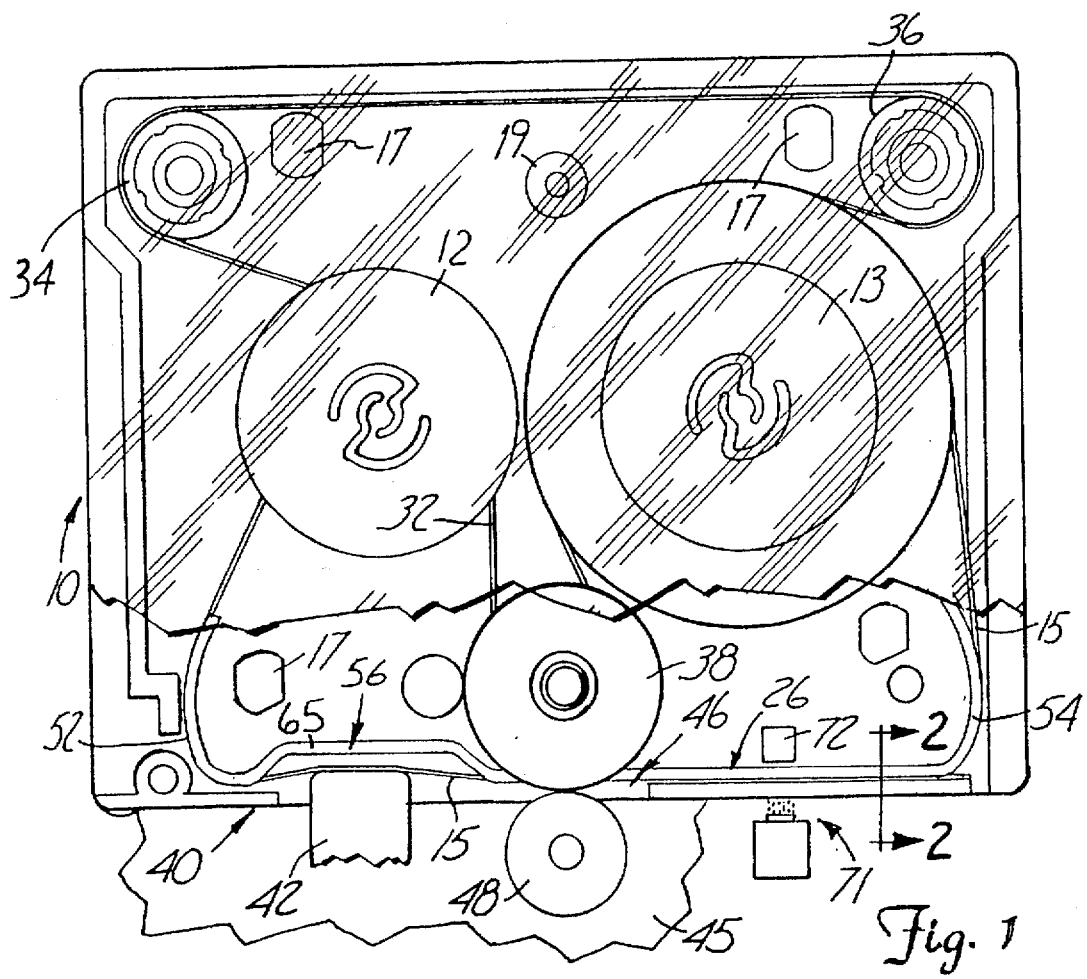
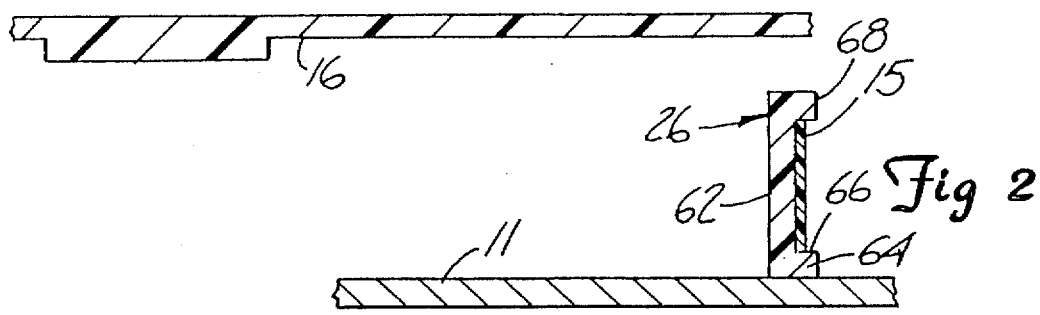

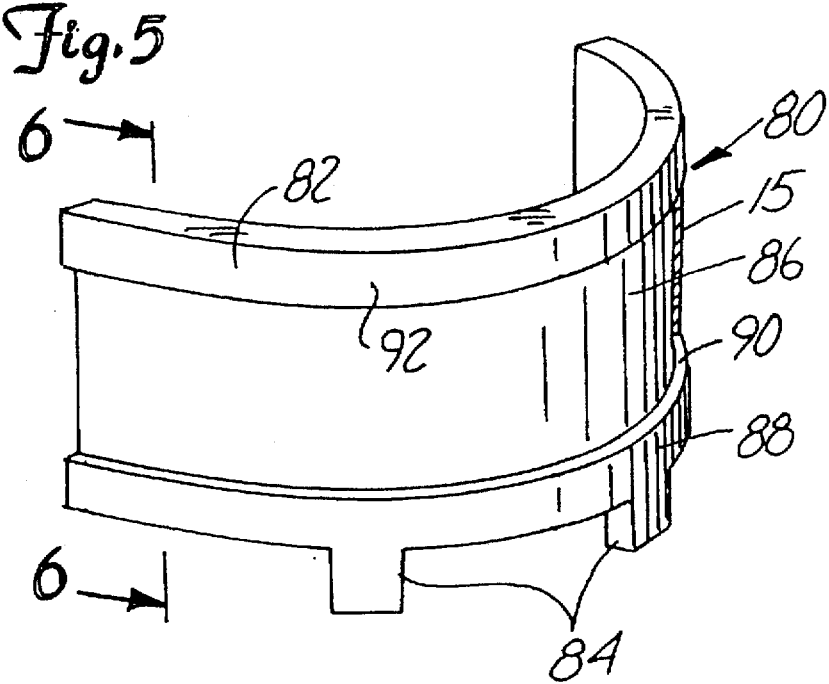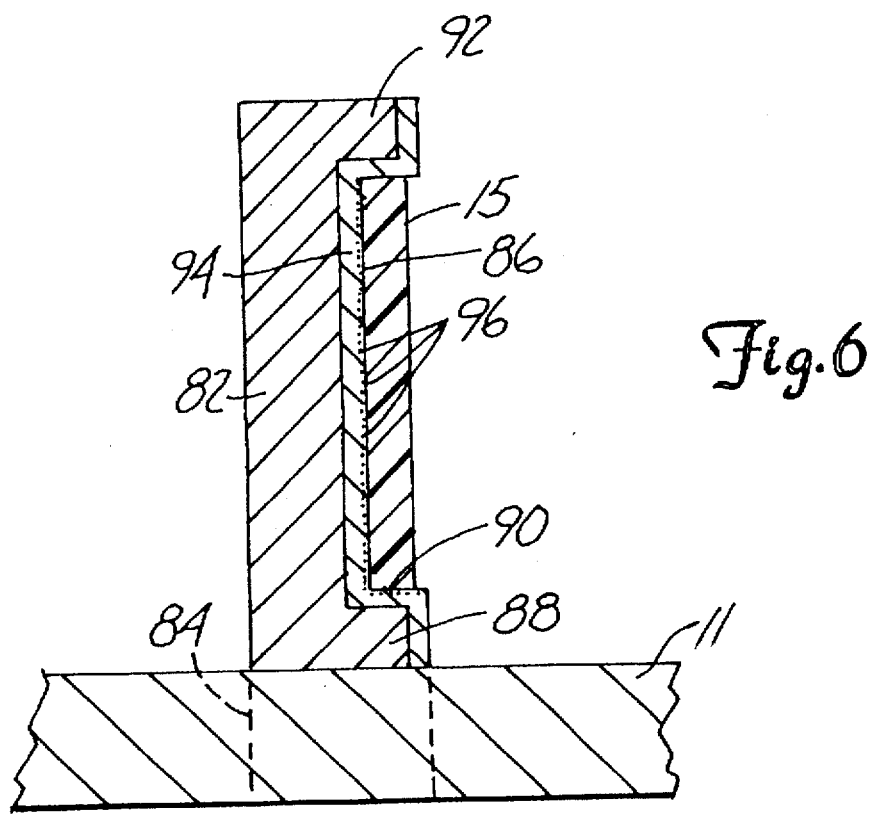

TAPE GUIDES FOR DATA CARTRIDGES

This is a continuation of application Ser. No. 08/699,704 filed Aug. 8, 1996, abandoned, which is a continuation of application Ser. No. 08/246,169 filed May 19, 1994, now abandoned.

BACKGROUND OF THE INVENTION

This invention relates to improved tape guidance in a magnetic tape data cartridge.

Magnetic tape cartridges for magnetic tape carrying digital data on a number of tracks across the tape are well known. Tape cartridges include a cartridge shell that defines an enclosure, and a pair of tape reels supported within the enclosure. A length of magnetic tape extends along a tape path within the enclosure. Each end of the tape is wound onto one of the reels. The tape moves past suitable guides and across an opening in an edge of the cartridge into which a read/write head or transducer protrudes to tension the tape and write or read data when the cartridge is inserted into a recording/reproducing machine. The tape is driven by a belt so that the lineal tape speed is controlled precisely. Tape speeds are now in the range of 20 inches per second to 120 inches per second.

In order to maintain the tape properly positioned so that each of the very narrow individual tracks of data is appropriately positioned as it crosses the read/write head, it is important that the tape be guided precisely along its path of travel.

It is desirable to increase the density of the data tracks on a one-quarter inch tape, utilizing a standard belt driven cartridge. The present invention aids in achieving increased density.

Servo-drives are also used for positioning a tape under positive control, but such drives are expensive. The present invention aids in reducing the band width of tape control in servo-drives as well as reducing the complexity, and thus cost, of such drives.

Magnetic tape cartridges of the type disclosed in, for example, U.S. Pat. No. 5,104,058, provide precisely located reference surfaces in the form of flanged guide pins for positioning an edge of the tape relative to the head, at selected points along its path, and means for urging the tape into engagement with the flanges so as to position the tape, and hence the tracks of recorded data relative to the head. The function of urging the tape into engagement with the guide pin flanges results from the angle at which the flanged guide pins are inserted into the baseplate. By inserting at least one of the guide pins into the baseplate with a slight deviation from perpendicularity with the baseplate, a steering effect which urges the tape into engagement with particular flanges of the guide pins is provided to guide the data tracks relative to the head.

Flanged cylindrical tape guides have the additional advantage being able to be manufactured to a high degree of precision, since they can be produced on an automatic lathe, or screw machine.

A multiple roller tape guidance system which provides an arcuate path further is disclosed in U.S. Pat. No. 5,173,828. Three rollers on each side of the transducer are provided to guide the tape in its path.

A tape guide which engages the edges of the tape over a longer distance, thereby enabling a lubricating air film to form, so as to reduce frictional drag on the tape, is disclosed in EP 536 912, assigned to Minnesota Mining and Manufacturing Co. In addition, the longer engagement length serves to damp out vibrations and other transport deviations which might otherwise result from conditions upstream from the guide, such as tape reel and other transport rollers eccentricities.

The tape guide also must be highly abrasion resistant, since magnetic recording tape is inherently abrasive. In IBM Technical Disclosure Bulletin Vol. 29, No. 5, October, 1986, wear resistant pads are used to contact the edge of the tape in a compliant guide system, thereby enabling the material for the spring portion of the compliant guide to be chosen without trading off spring properties for wear properties.

Surface coatings for imparting wear resistance to surfaces which might not otherwise resist wear are known. U.S. Pat. No. 4,594,772, for example, discloses a hard anodize coating which is resistant to wear caused by transport of magnetic tape.

In addition, dry lubricants can be incorporated into wear resistant anodized coatings for the purpose of reducing friction. Such coatings are used in the present invention and are described in the following references:

Seitzinger, R. C., "Coatings that Cut Friction," *MACHINE DESIGN*, Oct. 21, 1976, pp. 114–119.

Covino, C. P., "Hard Coat Plus Solid Lube Fights Wear Problems, " *METAL PROGRESS*, June, 1975, pp. 69–70.

The present invention provides an elongated guide that stabilized a magnetic tape as it is moved in a path in a belt driven tape cartridge. The elongated support aids in maintaining the data tracks on the tape properly aligned.

SUMMARY OF THE INVENTION

A magnetic tape mounted in a tape cartridge is guided by an elongated tape guide having at least one fixed guide flange surface to properly guide the tape across a transducer or read/write head. The elongated guide flange stabilizes the lateral position of the tape as it moves to and from a transducer.

The elongated tape guide of the present invention provides a flange support surface, and a vertical wall surface against which the tape rides so that it is stabilized and held closely in a desired path immediately prior to and after passing the transducer or read/write head. The elongated guide can be made as a one-piece guide that extends across the edge of a tape cartridge in which the tape is mounted and through which a transducer of a recorder extends. With the one-piece guide, curved ends are provided for causing the tape to change direction to be properly guided in the desired tape path, and also to provide rigidity to the tape due to the curvature of the tape. The tape rides against the vertical guide wall, which is perpendicular to a base wall of the tape cartridge. The tape is restrained laterally by a lower reference flange and from moving in a lateral or vertical direction through a fixed upper retaining flange, as disclosed. The upper flange could be a compliant flange if desired, to urge the tape toward the reference flange.

The one piece tape guide can be fabricated by assembling components together, or it can be a formed, cross section, i.e., extruded, rolled or formed in other ways from a suitable material, such as aluminum, stainless steel, or another metal, or the elongated tape guide could be molded from a moldable material if desired. The elongated tape guide is formed with recessed portion that permit the tape to be spaced from the guide in the area where the transducer engages the tape, so that the tape can deflect to ensure that there is adequate tape tension as the tape passes the transducer or read/write head.

The elongated tape guide according to the first form of the invention extends across substantially the entire edge of the tape cartridge where a drive puck for driving the tape, and the transducer head are located. The elongated tape guide is provided with a light transmitting opening adjacent the conventional tape end sensing mirror to permit light transmission at the standard location on tape cartridges for optical sensing of the end of the tape. This aperture is through the wall that extends perpendicular to the base plate of the tape cartridge.

An additional opening or aperture can be provided in the wall of the guide if desired for use in processing the elongated guide.

The concept of an elongated support flange at the corners where the tape changes direction and is bent in a longitudinal curve using an elongated guide can be accomplished with a modular construction in which separate curved end sections are provided in the desired locations. The end curved sections are at the lead in and exit ends of the transducer, and have adequate length for stabilizing the tape as it is guided, as well as having flanges for holding the tape in a proper orientation.

The present guides are advantageously made from aluminum, which can be easily and precisely extruded, and then stamped and formed to shape. Aluminum elongated guides can be anodized to provide an outer layer of aluminum oxide, which is harder and more wear resistant than stainless steel conventionally used for guide posts. The parts can be fabricated in one piece, whether it is the entire elongated guide with two curved ends, or a modular elongated guide which causes the tape to form into a fairly large radius longitudinal curve. The one piece fabrication results in the position of guide flanges being held quite precisely. Aluminum is non-magnetic and cannot demagnetize the tape, and the anodized guides can be provided with a surface lubricant so that a low friction surface is achieved, to reduce friction loads even at low speeds.

BRIEF DESCRIPTION OF THE DRAWINGS

FIG. 1 is a plan view of a magnetic tape cartridge including an elongated guide flange made according to the present invention;

FIG. 2 is a fragmentary enlarged view sectional of a tape guide made according to the present invention taken on line 2—2 in FIG. 1;

FIG. 5 is a perspective view of a modified form of the elongated guide; and

FIG. 6 is an enlarged sectional view taken as on line 6—6 in FIG. 5.

DETAILED DESCRIPTION OF THE PREFERRED EMBODIMENTS

Figure 3:
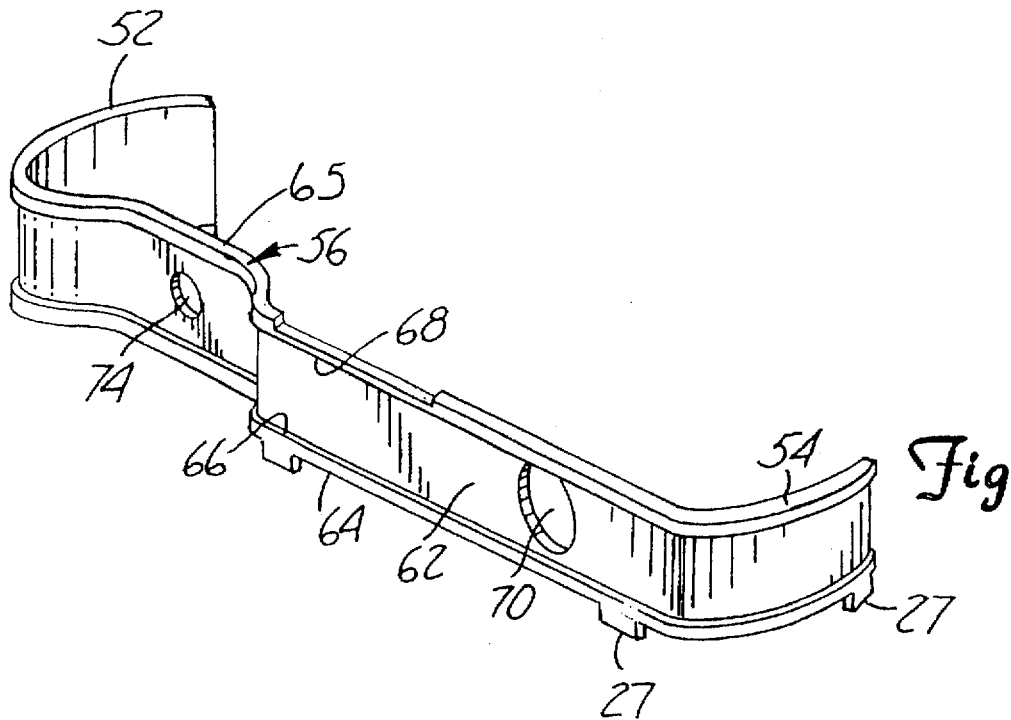
FIG. 3 is a perspective view of the elongated tape guide of the present invention.

Referring first to FIG. 1, a magnetic tape cartridge for carrying digital data indicated generally at 10 defines an enclosure, in which a pair of tape reels 12 and 13 are supported for free rotation about spaced, parallel axes. A length of magnetic tape 15 is moved along a tape path established by suitable guides, as will be explained. The opposite ends of the tape 15 are connected to reels 12 and 13.

Tape cartridge 10 includes a base plate 11 made of aluminum, or other suitable material, and a clear or translucent polymeric cover 16 is provided to form the tape cartridge enclosure. The cover 16 is removably fastened to the base plate 11 with conventional snap fasteners shown schematically at 17. Screw bosses 19 also are provided as needed for attachment of parts to the base plate 11 and/or cover 16.

A path for the tape 15 is defined with respect to the reels 12 and 13 by the use of an elongated tape guide 26 made according to a first form of the present invention. The guide 26 positions the tape properly in the region where the tape is engaged with a transducer or read/write head 42.

A drive belt 32 is mounted over belt guide rollers 34 and 36 and a belt drive roller 38. The belt 32 is an endless belt that contacts and drives against the outer surfaces of the tape wound on the tape spools or reels in a known manner as the belt drive roller 38 is driven. The drive belt 32 is self tensioning and maintains tension and proper speed as one reel of tape increases in size and the other reduces, as described in U.S. Pat. No. 5,289,988.

The tape cartridge 10 is formed with a cut away edge portion 40 which provides access to the magnetic tape 15 by a magnetic transducer 42. The cut away portion 40 is normally closed by a spring loaded door which is opened upon insertion of the tape cartridge into a tape recorder shown fragmentarily at 45. A second opening 46 is provided in the cover 16 to provide access for a belt drive capstan or puck 48. The drive puck 48 forms part of the tape recorder and is driven by a controllable and reversible motor (not shown). The magnetic transducer or read/write head 42 and the drive puck 48 are shown only illustratively since they form a part of the tape recorder rather than the tape cartridge and are conventional. The drive puck 48 engages and drives against an upper drive flange on the belt drive roller 38.

The motor driving the drive puck 48 is reversible, and is capable of high speed operation. The positioning of the tape 15 is established with the elongated tape guide 26.

The base plate 11 is a relatively rigid plate, generally made of aluminum to provide support. The elongated tape guide 26 is held in place by any selected one of a number of known fasteners. For example, integral mounting pegs 27 may be mounted in apertures in the base plate 11 and securely held in place in the base plate 11 at the desired location.

The tape 15 is guided by the elongated tape guide 26 along a substantial portion of its path of movement between reels and the guide extends along the edge of the tape cartridge where the transducer is located. The elongated tape guide 26 is formed to have curved guide end portions 52 and 54, and formed center portions 56 that are made so that they will clear the drive roller 38 and other components of the cartridge and tape recorder, and provide the desired tape path across the read/write head or transducer 42.

The elongated tape guide 26 as shown in FIGS. 2 and 3 has an upright guide wall 62 that has a surface generally perpendicular to the base plate 11. A formed flange 64 rests on the base plate 11 and has a reference support shoulder surface 66 fixed at a proper location relative to the upper surface of the base plate 11 to position the lower edge of tape 15 at a desired height. A precisely located upper flange 68 is fixed to wall 62 and overlies flange 64 so tape 15 is guided between the flanges 64 and 68 as it moves along wall 62. The elongated tape guide 26 is formed with recessed portion 65 that permits the tape 15 to be spaced from the guide 26 in the area where the transducer 42 engages the tape 15. This allows the tape 15 to deflect to ensure that there is adequate tape tension as the tape 15 passes the transducer 42.

Figure 4:
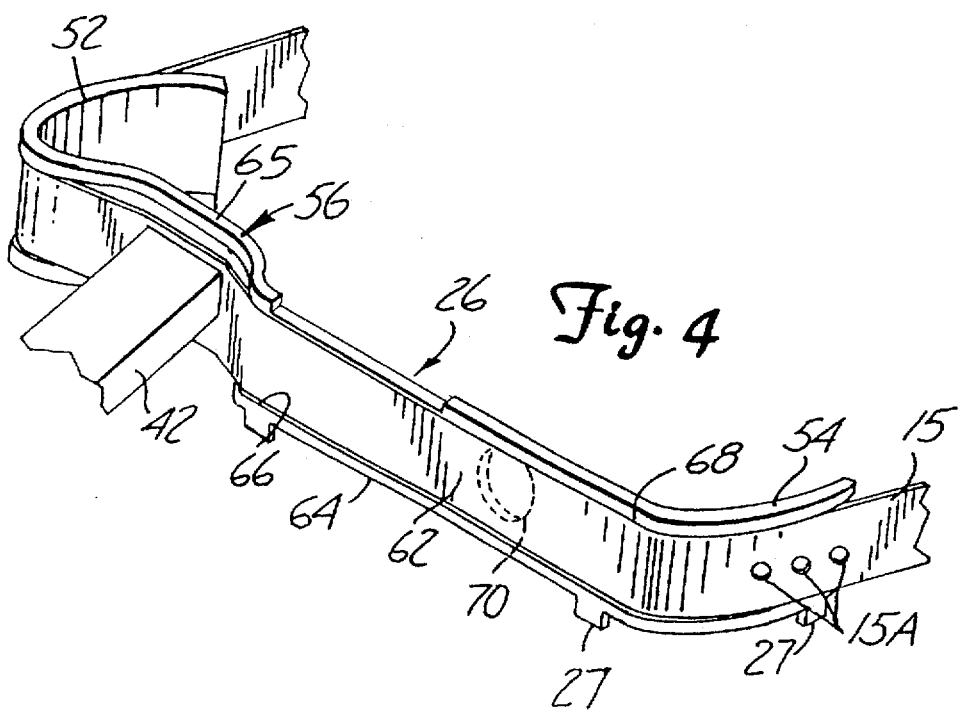
FIG. 4 is a perspective schematic view of an extended tape guide made according to the present invention, illustrating a transducer engaging a tape supported on the elongated guide.

As shown in FIG. 3, the tape guide wall 62 is provided with an aperture 70 for permitting transmission of optical signals that are used to sense the approach of the end of the tape 15. The data carrying tapes used have light transmitting holes schematically shown at 15A in FIG. 4, near the tape end. An optical sensor arrangement 71 using a mirror 72 and light source (FIG. 1) in a standard tape cartridge senses light transmission through the tape holes 15A and aperture 70 when they align. The light signal indicates the approach of the tape end. The aperture 70 permits use of the existing tape end optical sensing arrangement 71 with the elongated tape guide 26.

A smaller aperture 74 in the wall 62 of elongated tape guide 26, also shown in FIG. 3, is used as a locating hole for aiding in forming the curved end portions and other formed portions of the elongated tape guide 26 in the proper locations.

When the elongated tape guide 26 is made of aluminum, it can be anodized to form a hard exterior coating on wall 62 and flanges 64 and 68, which is essentially aluminum oxide, and then a treatment of a dry, low friction coefficient material can be applied to fill pores in the hard coating to provide a low friction surface. The aluminum guide also can be plated with hard metal materials such as nickel or chromium to reduce wear.

Reducing the friction coefficient of the surface of wall 62 reduces the wear on the tape as well, to prolong the life of the tape and make writing on the tape and reproduction of the data on the tape more reliable.

A second form of the invention is shown in FIGS. 5 and 6, and in this form of the invention, an elongated tape guide indicated generally at 80 is formed into a part cylindrical shape, as shown, so that tape 15 on the guide will be curved in a longitudinal direction. The tape guide 80 comprises an aluminum extrusion or formed channel 82 that can be formed and then sheared to provide locating pegs 84, which fit into and are retained in provided openings in a base plate for holding the tape guide securely with respect to the base plate of a tape cartridge. The base plate is shown in the first form of the invention.

The tape guide 80 includes an upright wall 86, and a lower flange 88 that has a tape edge support surface 90. An upper flange 92 is also provided, so that the tape 15 is positioned between the flanges, as it is guided around the curved surface of the wall 86. The curve is gentle so the length of the guide is substantial. Tape guides 80 can be positioned, for example, at the two locations of the curved guide end portions 52 and 54 in the first form of the invention. Thus, there would be two such elongated tape guides 80 to guide the tape in a line across the location of the transducer 42.

The flange surface 90 and wall 86 support and guide the tape 15 and the length of the tape supported on these surfaces is substantially greater than the length of support of tape on a roller or post used for guiding the tape in present tape cartridges.

The material used for tape guide 80 preferably is aluminum, that includes an anodized layer, with a layer of low coefficient of friction material added for reducing friction. As shown in FIG. 6, the aluminum channel or extrusion 82 has an anodized layer represented generally at 94. A solid lubricant (low coefficient of friction) material is impregnated into pores of the anodized layer. The lubricant is indicated by dots 96, schematically. The dry lubricant is applied by known techniques and provides a reduced friction surface for tape support.

The elongated tape guide shown in FIGS. 5 and 6 is formed into the desired curved shape after extrusion. Suitable apertures are provided in the baseplate 11 of a tape cartridge for receiving the mounting pegs 84 and for supporting the tape guide 80.

The aluminum oxide surface provided by anodizing is harder than the underlying aluminum, and also harder than stainless steel, so that wear is less of a problem. The treatment of the surface with a solid lubricant reduces loads on the tape and leads to greater tape life, even at relatively low speeds.

The longitudinal length of the support wall 86 is substantially greater than the tape width to provide the desired support. The wall also is relatively thin for extrusion with the integral flanges and subsequent forming.

Two curved sections 80, one on each side of the transducer may be used to provide a straight length of tape, for engagement with the transducer. The transducer tensions the tape by deflecting the tape out of a plane between the curved sections. The elongated guide is formed to permit such deflection.

Although the present invention has been described with reference to preferred embodiments, workers skilled in the art will recognize that changes may be made in form and detail without departing from the spirit and scope of the inventions

What is claimed is:

1. A belt-driven magnetic tape cartridge, comprising:
    (a) a cartridge housing comprising a peripheral edge wall, said edge wall including a cutaway portion to allow access by a transducer and a drive capstan opening to allow access by a drive capstan;
    (b) a pair of tape reels rotatably mounted in the housing on spaced, parallel axes;
    (c) a length of magnetic recording tape wound on the reels such that a portion of the magnetic recording tape extends from one reel to the other along a tape path, wherein a portion of the tape path extends along the peripheral edge wall across the cutaway portion;
    (d) means for defining a drive belt path;
    (e) a drive belt extending along the drive belt path such that the drive belt frictionally engages a portion of the magnetic recording tape to cause transport of the tape from one tape reel to the other; and
    (f) a tape guide disposed along said portion of the tape path which extends along the peripheral edge wall and across the cutaway portion, wherein the tape guide comprises a vertical guide wall to provide a surface for slideably engaging the tape as the tape is guided along said tape path portion, said vertical guide wall comprising:
        (i) first and second curved end portions having respective curved end portion surfaces for slideably engaging the tape, wherein the first curved end portion is disposed along the tape path on one side of the cutaway portion and the second curved end portion is disposed along the tape path on the other side of the cutaway portion relative to the first curved end portion; and
        (ii) a center portion extending from the first curved end portion to the second curved end portion, wherein the center portion comprises a center portion surface for slideably engaging the tape and a recessed portion corresponding to the cutaway portion of the peripheral edge wall such that the portion of the tape being guided across the cutaway portion by the tape guide is spaced from the recessed portion when said tape portion is contacted by a transducer through the cutaway portion.

2. The tape guide of claim 1 wherein the guide wall has a lower reference flange for supporting at least one edge of the tape being guided.

3. The tape guide of claim 1, wherein the tape guide is disposed along said portion of the tape path such that the second curved end portion is disposed along the tape path on the other side of the cutaway portion and the drive capstan opening relative to the first curved end portion.

4. The tape guide of claim 3 wherein the guide wall has a light transmitting aperture thereon positioned to align with apertures provided in the tape as the tape moves along the tape path.

5. The tape guide of claim 1 wherein the ape guide is made of aluminum and the surface which the tape engages is hardened.

6. The tape guide of claim 1 wherein the hardened surface of the tape guide further incorporates a dry lubricant to reduce friction on the tape.

7. The tape guide of claim 1 wherein said tape guide has a pair of integral flanges thereon extending along edges of the guide wall, the flanges defining a lateral width and being spaced to receive the tape between them.

8. The tape guide of claim 1 wherein the tape guide is made from an extruded metal.

* * * * *